H. LEBER.
Churn.
No. 82,235.
Patented Sept. 15, 1868.
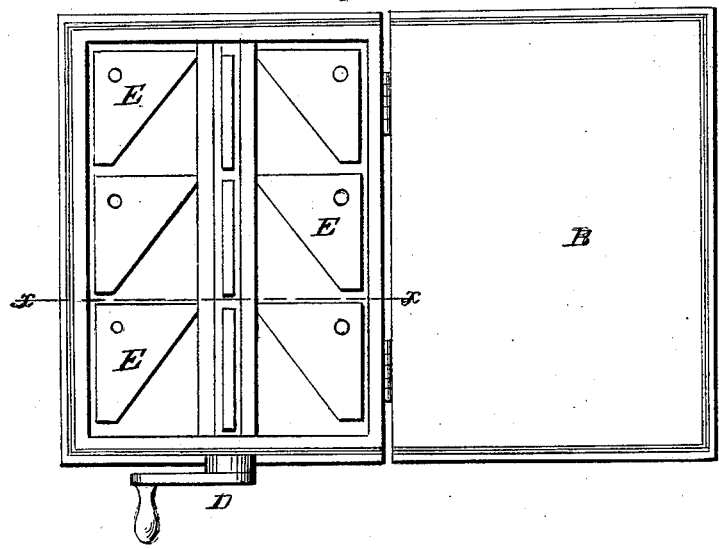
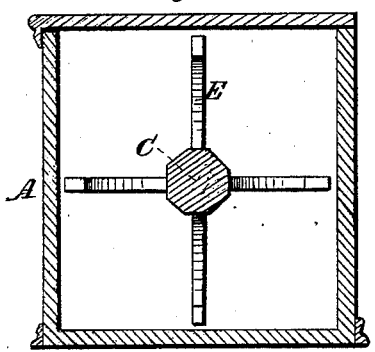
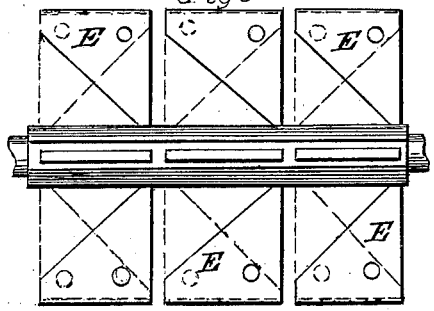
Witnesses.
Louis Brodhag
Chas D Smith
Inventor.
Henry Leber

United States Patent Office.

HENRY LEBER, OF BELLFAIR MILLS, VIRGINIA.

*Letters Patent No. 82,235, dated September 15, 1868*

IMPROVEMENT IN CHURNS.

*The Schedule referred to in these Letters Patent and making part of the same.*

TO ALL WHOM IT MAY CONCERN:

Be it known that I, HENRY LEBER, of Bellfair Mills, in the county of Stafford, and State of Virginia, have invented a new and useful Improvement in Churns; and I do hereby declare the following to be a full, clear, and exact description of my invention, sufficient to enable others skilled in the art to which it appertains to fully understand and use the same, reference being had to the accompanying drawings, making part of the specification, in which—

Figure 1 is a central vertical section in the line $x\ x$, fig. 2.

Figure 2 is a plan or top view.

Figure 3 is a detached view of the paddles.

Similar letters of reference indicate corresponding parts in the several figures.

My invention consists in so attaching a series of paddles to a rotating shaft, that the cream will be subjected to such a variety of motion as to produce the greatest quantity of butter in the shortest possible time, as will be hereinafter described.

In the drawings, A represents a box or body of the churn, of suitable form and size, and provided with a proper lid, B.

C is a shaft, mounted within the box, on its side, so as to permit its ready rotation, and has secured to one of its projecting ends a crank or handle, D, for operation thereof.

E represents the paddles or floats, which consist of pieces of wood or other material, in the form of right-angle triangles.

They are secured to the shaft C at their pointed end, so that their bases shall face outwardly, and are arranged or located upon said shaft in alternate ranks, and so that the oblique angles shall be reversed, that is, inclined in opposite direction.

The great advantage of this arrangement is that the cream is subjected to such a variety of motion that the greatest quantity of butter is produced from the cream, and in from three to ten minutes, more or less, the cream being of proper temperature.

Having thus described my invention, what I claim as new, and desire to secure by Letters Patent, is—

The herein-described triangular form of paddles, arranged in alternate ranks, in opposite position, as relates to their angles upon the shaft, as herein shown and described.

HENRY LEBER.

Witnesses:
   A. DELOZIER,
   B. WILLIAMS.